May 7, 1957     J. D. MEMOLI     2,791,057
FISH LURE
Filed July 22, 1954
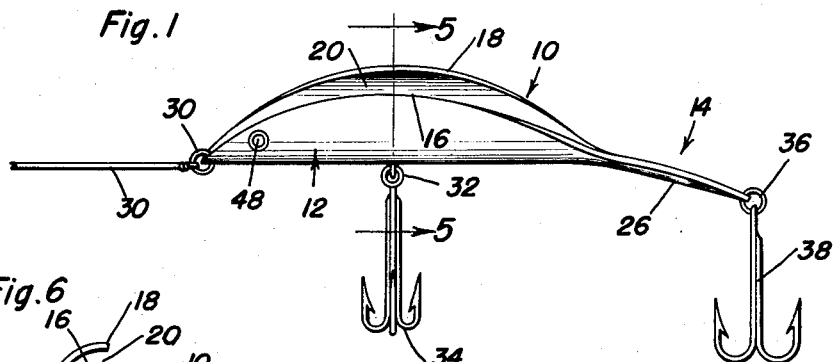
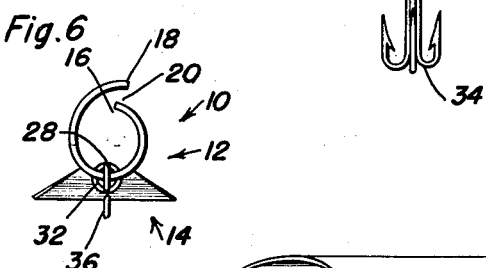
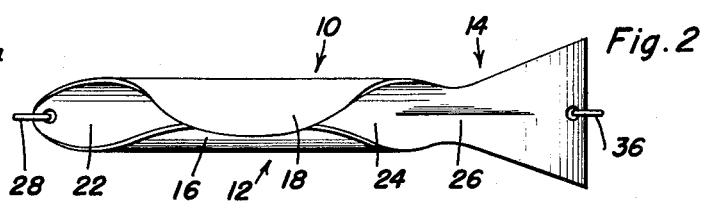
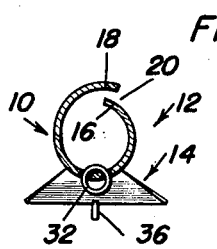
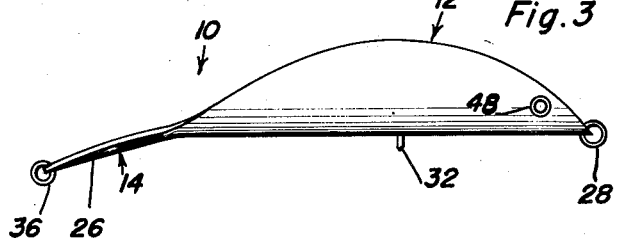
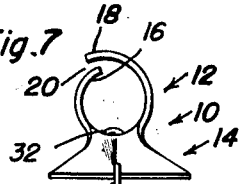
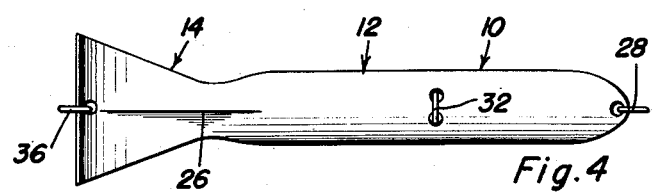
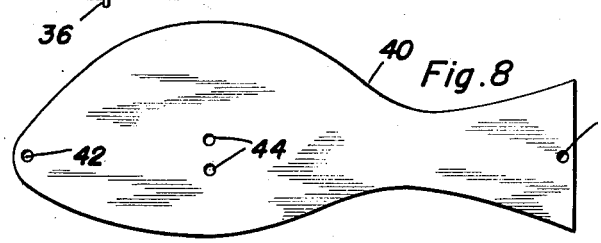
Joseph D. Memoli
INVENTOR.

United States Patent Office 2,791,057
Patented May 7, 1957

2,791,057

FISH LURE

Joseph D. Memoli, Raritan, N. J.

Application July 22, 1954, Serial No. 445,047

3 Claims. (Cl. 43—42.06)

This invention relates in general to improvements in fishing devices, and more specifically to an improved fishing lure.

The primary object of this invention is to provide an improved fishing lure which is so constructed and designed whereby when pulled through the water will simulate a minnow, and therefore, will be extremely effective as a lure.

Another object of this invention is to provide an improved fishing lure whose construction is such that it may be utilized at any depth from one inch below the surface of the water to substantially the bottom.

A further object of this invention is to provide an improved fishing lure which is of such a construction whereby it may be stamped from a single sheet in a simple stamping operation so that the manufacture thereof is economically feasible.

A still further object of this invention is to provide an improved fishing lure which resembles a minnow, the fishing lure being so constructed that when pulled through the water, it will have a zig-zag action and will have approximately a half-body roll so as to increase its attractiveness and form a more realistic lure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the fish lure which is the subject of this invention and shows the general outline thereof;

Figure 2 is a top plan view of the fish lure of Figure 1;

Figure 3 is a rotated side elevational view of the fish lure of Figure 1 and shows the same with the hooks and fishing line thereof removed;

Figure 4 is a bottom plan view of the fishing lure of Figure 3 and shows the arrangement of attaching eyes thereof;

Figure 5 is a transverse vertical sectional view taken substantially on the plane indicated by the section line 5—5 of Figure 1 with the hooks omitted, and shows the general cross-section of the fishing lure;

Figure 6 is a front elevational view of the fish lure as it appears in Figure 3;

Figure 7 is a rear elevational view of the fish lure as it appears in Figure 3; and Figure 8 is a plan view of the blank from which the fish lure is formed.

Referring now to the drawings in detail, it will be seen that there is illustrated the fish lure which is the subject of this invention, the fish lure being referred to in general by the reference numeral 10. The fish lure 10 includes a relatively large body portion, which is referred to in general by the reference numeral 12. The body portion 12 terminates in an elongated tail portion 14.

The body portion 12 includes a bottom part which is in a continuous straight line, as is best illustrated in Figures 1 and 3. The body portion 12 extends upwardly from the bottom part and is arcuate in cross-section, as is best illustrated in Figure 5. The intermediate part of the body portion 12 has overlapping upper parts 16 and 18, as is best illustrated in Figure 5. The upper parts 16 and 18 are disposed slightly at one side of the body portion 12 and are in spaced relation to form a side entrance 20 to the interior of the body portion 12.

As is best illustrated in Figure 2, the body portion 12 is provided with an open forward part 22 and a similarly open rear part 24. In this manner, water may pass through the body portion 12 when the lure 10 is pulled through the water.

The tail portion 14 is connected to the rear of the body portion 12 along the bottom part thereof and slopes slightly downwardly and rearwardly therefrom. It is to be noted that the tail portion 14 increases in width rearwardly so as to resemble the tail fin of a minnow.

In order that the relative position of the tail portion 14 with respect to the body portion 12 may be maintained, there is provided a reinforcing rib 26. The reinforcing rib 26 is disposed in alignment with the longitudinal line through the center of the bottom part of the body portion 12 described above.

The forward or head end of the body portion 12 is provided with an eye 28 which is also in alignment with the longitudinal line through the bottom part of the body portion 12. The eye 28 has removably attached thereto a leader 30 or other parts of a fishing line. Secured to the bottom part of the body portion 12 intermediate the ends thereof is a transversely disposed eye 32. The eye 32 has removably secured thereto a suitable hook 34. A third eye is connected to the rear end of the tail portion 14, the third eye being referred to by the reference numeral 36 and being disposed in alignment with the line through the bottom part of the body portion 12. The eye 36 has removably connected thereto a second hook 38.

Referring now to Figure 8 in particular, it will be seen that there is illustrated a blank 40 from which the fishing lure 10 is formed. The blank 40 is stamped from a flat sheet of material and has an outline such that when it is rolled, it will form the fishing lure 10. The forward end of the blank 40 is provided with an aperture 42 through which the eye 28 passes. The blank 40 is provided intermediate its ends with a pair of transversely aligned openings 44 through which the eye 32 passes. A fourth opening 46 is formed in the rear portion of the blank 40 for the reception of the eye 36.

It is preferred that the blank 40 be formed of sheet metal, although other suitable materials may be utilized. Further, it is to be understood that the fish lure 10 may be painted or otherwise colored, as desired, to be more attractive. Further, the head part of the body portion 12 may have painted thereon suitable eyes 48. Due to the particular outline of the body portion 12 and the tail portion 14, the fishing lure 10 will resemble a minnow.

Because of the particular shape of the fishing lure 10, as it is drawn through the water, it will have a zig-zag action. Further, because of the relationship of the upper parts 16 and 18 and the effect of the water passing through the body portion 12, there will be a tendency for the fishing lure 10 to roll to one side. The tail portion 14 will counteract such roll, and accordingly, the fish lure 10, when pulled through the water, will have a continuous half-rolling action in addition to its zig-zag course. This greatly enhances the advantages of the fishing lure 10 in its attraction to fish.

The fishing lure 10 is primarily intended for use with casting or spinning rods. Due to its particular construction, it may be utilized at any depth, starting with one inch below the surface of the water being fished.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A fishing lure comprising a one piece hollow body portion having an integral tail portion, said body portion being arcuate in cross-section and including a bottom part lying in a straight line, a towing eye connected to said bottom part in alignment with said straight line at the forward end of said body portion, a depending hook secured to said bottom part rearwardly of said towing eye, said body portion including an intermediate part having overlapping upper parts, said overlapping upper parts being in spaced relation to form a side entrance to said body portion.

2. A fishing lure comprising a one piece hollow body portion having an integral tail portion, said body portion being arcuate in cross-section and including a bottom part lying in a straight line, a towing eye connected to said bottom part in alignment with said straight line at the forward end of said body portion, a depending hook secured to said bottom part rearwardly of said towing eye, said body portion including an intermediate part having overlapping upper parts, said overlapping upper parts being in spaced relation to form a side entrance to said body portion, said overlapping upper parts being disposed slightly at one side of the longitudinal center line of said body portion.

3. A fishing lure comprising a one piece body portion having an integral tail portion, said body portion being continuously arcuate in cross-section and including a bottom part lying in a straight line, a towing eye connected to said bottom part in alignment with said straight line at the forward end of said body portion, a depending hook secured to said bottom part rearwardly of said towing eye, said tail portion forming an extension of said bottom part and extending downwardly therefrom, said tail portion being reinforced at its junction with said body portion by a reinforcing rib, said reinforcing rib being longitudinally aligned with said straight line.

References Cited in the file of this patent
UNITED STATES PATENTS

| | | |
|---|---|---|
| D. 162,776 | Bekkala | Apr. 10, 1951 |
| 422,226 | Kestner | Feb. 25, 1890 |
| 1,101,655 | Ness | June 30, 1914 |
| 1,806,088 | Schnell | May 19, 1931 |
| 1,976,695 | Boehm | Oct. 9, 1934 |
| 2,013,898 | Ridenour | Sept. 10, 1935 |
| 2,088,775 | Davenport | Aug. 3, 1937 |
| 2,500,451 | Cadd | Mar. 14, 1950 |
| 2,538,703 | Perry | Jan. 16, 1951 |
| 2,586,073 | McKee | Feb. 19, 1952 |
| 2,612,717 | Kuehnel | Oct. 7, 1952 |